(12) United States Patent  
Fulton

(10) Patent No.: US 9,184,646 B2  
(45) Date of Patent: Nov. 10, 2015

(54) STARTER MACHINE SYSTEM AND METHOD

(75) Inventor: David A. Fulton, Anderson, IN (US)

(73) Assignee: REMY TECHNOLOGIES, LLC, Chicago, IL (US)

( * ) Notice: Subject to any disclaimer, the term of this patent is extended or adjusted under 35 U.S.C. 154(b) by 670 days.

(21) Appl. No.: 13/442,776

(22) Filed: Apr. 9, 2012

(65) Prior Publication Data

US 2012/0256524 A1 Oct. 11, 2012

Related U.S. Application Data

(60) Provisional application No. 61/473,032, filed on Apr. 7, 2011, provisional application No. 61/473,042, filed on Apr. 7, 2011, provisional application No. 61/473,048, filed on Apr. 7, 2011.

(51) Int. Cl.
| | |
|---|---|
| *H02K 21/04* | (2006.01) |
| *F02N 15/06* | (2006.01) |
| *H02K 23/04* | (2006.01) |
| *B60L 11/14* | (2006.01) |

(52) U.S. Cl.
CPC ............... *H02K 21/04* (2013.01); *B60L 11/14* (2013.01); *F02N 15/067* (2013.01); *H02K 23/04* (2013.01); *Y02T 10/641* (2013.01); *Y02T 10/70* (2013.01); *Y02T 10/7077* (2013.01); *Y02T 90/16* (2013.01); *Y10T 29/49009* (2015.01)

(58) Field of Classification Search
CPC ...................................... H02K 21/04
USPC ....................................... 310/181
See application file for complete search history.

(56) References Cited

U.S. PATENT DOCUMENTS

| | | | |
|---|---|---|---|
| 5,622,148 | A | 4/1997 | Xue et al. |
| 6,011,377 | A | 1/2000 | Heglund et al. |
| 6,104,157 | A | 8/2000 | Kramer et al. |
| 6,323,562 | B1 | 11/2001 | Renner et al. |
| 6,563,248 | B2 * | 5/2003 | Fujita ............................. 310/181 |
| 6,608,394 | B2 | 8/2003 | Osada et al. |
| 6,634,332 | B2 | 10/2003 | Saito et al. |
| 6,651,603 | B2 | 11/2003 | Osada et al. |
| 6,653,807 | B2 | 11/2003 | Saito et al. |

(Continued)

FOREIGN PATENT DOCUMENTS

JP 2002070699 3/2002

OTHER PUBLICATIONS

WIPO Search Report and Written Opinion dated Oct. 29, 2012 for corresponding Application No. PCT/US2012/032801; 3 sheets.

*Primary Examiner* — Dang Le  
(74) *Attorney, Agent, or Firm* — Greenberg Traurig LLP

(57) ABSTRACT

Embodiments of the invention provide a starter machine control system including an electronic control unit. The control system can include a starter machine that is in communication with the electronic control unit. The starter machine can comprise a solenoid assembly that includes at least one biasing members and a coil winding. The starter machine can also include a motor that is coupled to a pinion. The motor can include a field assembly and an armature assembly. The field assembly can include a support body and permanent magnets that are supported within the support body. A plurality of flux members can be disposed between the permanent magnets. A plurality of windings can be disposed around the flux members and can be coupled to a control circuit.

14 Claims, 15 Drawing Sheets

(56) References Cited

U.S. PATENT DOCUMENTS

| | | |
|---|---|---|
| 6,702,718 B2 | 3/2004 | Tani |
| 6,754,579 B2 | 6/2004 | Kamiya et al. |
| 6,817,329 B2 | 11/2004 | Buglione et al. |
| 6,822,544 B2 | 11/2004 | Shiga et al. |
| 7,009,475 B2 | 3/2006 | Niimi et al. |
| 7,027,911 B2 | 4/2006 | Nishikawa et al. |
| 7,066,128 B2 | 6/2006 | Satake et al. |
| 7,177,755 B2 | 2/2007 | Nishikawa et al. |
| 7,218,010 B2 | 5/2007 | Albertson et al. |
| 7,219,007 B2 | 5/2007 | Schuster et al. |
| 7,269,499 B2 | 9/2007 | Murakami |
| 7,275,509 B2 | 10/2007 | Kassner |
| 7,281,510 B2 | 10/2007 | Kondo |
| 7,287,500 B2 | 10/2007 | Izumi et al. |
| 7,458,353 B2 | 12/2008 | Takahashi |
| 7,535,328 B2 | 5/2009 | Kurasawa et al. |
| 7,628,138 B2 | 12/2009 | Ando |
| 7,701,104 B2 | 4/2010 | Akemakou |
| 7,733,201 B2 | 6/2010 | Yoneshima |
| 7,760,056 B2 | 7/2010 | Utsunomiya et al. |
| 7,797,099 B2 | 9/2010 | Terada |
| 7,848,875 B2 | 12/2010 | Nakai |
| 7,861,683 B2 | 1/2011 | Saitoh |
| 7,934,436 B2 | 5/2011 | Laubender |
| 7,949,461 B2 | 5/2011 | Takahashi |
| 7,977,841 B2 * | 7/2011 | Yang .............................. 310/181 |
| 7,982,565 B2 | 7/2011 | Bradfield |
| 8,036,815 B2 | 10/2011 | Okumoto et al. |
| 8,069,832 B2 | 12/2011 | Okumoto et al. |
| 2003/0150417 A1 | 8/2003 | Miwa |
| 2003/0209373 A1 | 11/2003 | Egami et al. |
| 2004/0168664 A1 | 9/2004 | Senda et al. |
| 2006/0058897 A1 | 3/2006 | Senda et al. |
| 2006/0117876 A1 | 6/2006 | Lepres et al. |
| 2006/0201266 A1 | 9/2006 | Kajino et al. |
| 2007/0199533 A1 | 8/2007 | Takahashi |
| 2008/0157622 A1 * | 7/2008 | Shah et al. .................... 310/184 |
| 2009/0020091 A1 | 1/2009 | Botzenhard et al. |
| 2009/0183595 A1 | 7/2009 | Niimi |
| 2009/0224557 A1 | 9/2009 | Reynolds et al. |
| 2009/0295399 A1 | 12/2009 | Ueda et al. |
| 2010/0000487 A1 | 1/2010 | Hoshino et al. |
| 2010/0033066 A1 | 2/2010 | Murata et al. |
| 2010/0036591 A1 | 2/2010 | Nakai |
| 2010/0059007 A1 | 3/2010 | Senda et al. |
| 2010/0083926 A1 | 4/2010 | Okumoto et al. |
| 2010/0090526 A1 | 4/2010 | Itou |
| 2010/0180849 A1 * | 7/2010 | Senda et al. ................ 123/179.4 |
| 2010/0184562 A1 | 7/2010 | Senda et al. |
| 2010/0217484 A1 | 8/2010 | Mizuno |
| 2010/0217493 A1 | 8/2010 | Tomura et al. |
| 2010/0222973 A1 | 9/2010 | Senda et al. |
| 2010/0229815 A1 | 9/2010 | Senda et al. |
| 2010/0242905 A1 | 9/2010 | Machida et al. |
| 2010/0251851 A1 | 10/2010 | Usami |
| 2010/0251852 A1 | 10/2010 | Murata et al. |
| 2010/0251853 A1 | 10/2010 | Usami et al. |
| 2010/0256896 A1 | 10/2010 | Kitano et al. |
| 2010/0257975 A1 | 10/2010 | Niimi et al. |
| 2010/0264670 A1 | 10/2010 | Usami et al. |
| 2010/0264764 A1 | 10/2010 | Usami et al. |
| 2010/0264765 A1 | 10/2010 | Haruno et al. |
| 2010/0269630 A1 | 10/2010 | Niimi et al. |
| 2010/0269631 A1 | 10/2010 | Niimi et al. |
| 2010/0269776 A1 | 10/2010 | Mizuno |
| 2010/0282199 A1 | 11/2010 | Heyers et al. |
| 2010/0282200 A1 | 11/2010 | Notani |
| 2011/0001589 A1 | 1/2011 | Usami et al. |
| 2011/0005486 A1 | 1/2011 | Nakamura |
| 2011/0056450 A1 | 3/2011 | Notani |
| 2011/0084786 A1 | 4/2011 | Niimi et al. |
| 2011/0095852 A1 | 4/2011 | Niimi et al. |
| 2011/0112740 A1 | 5/2011 | Hashimoto |
| 2011/0115238 A1 | 5/2011 | Biessenberger et al. |
| 2011/0118962 A1 | 5/2011 | Couetoux et al. |
| 2011/0132308 A1 | 6/2011 | Liu et al. |
| 2011/0137544 A1 | 6/2011 | Kawazu et al. |
| 2011/0139108 A1 | 6/2011 | Hashim |
| 2011/0146609 A1 | 6/2011 | Enoki |
| 2011/0174255 A1 | 7/2011 | Neuburger et al. |
| 2011/0184626 A1 | 7/2011 | Mauritz et al. |
| 2011/0248803 A1 | 10/2011 | Niimi et al. |
| 2012/0035837 A1 | 2/2012 | Okumoto et al. |

* cited by examiner

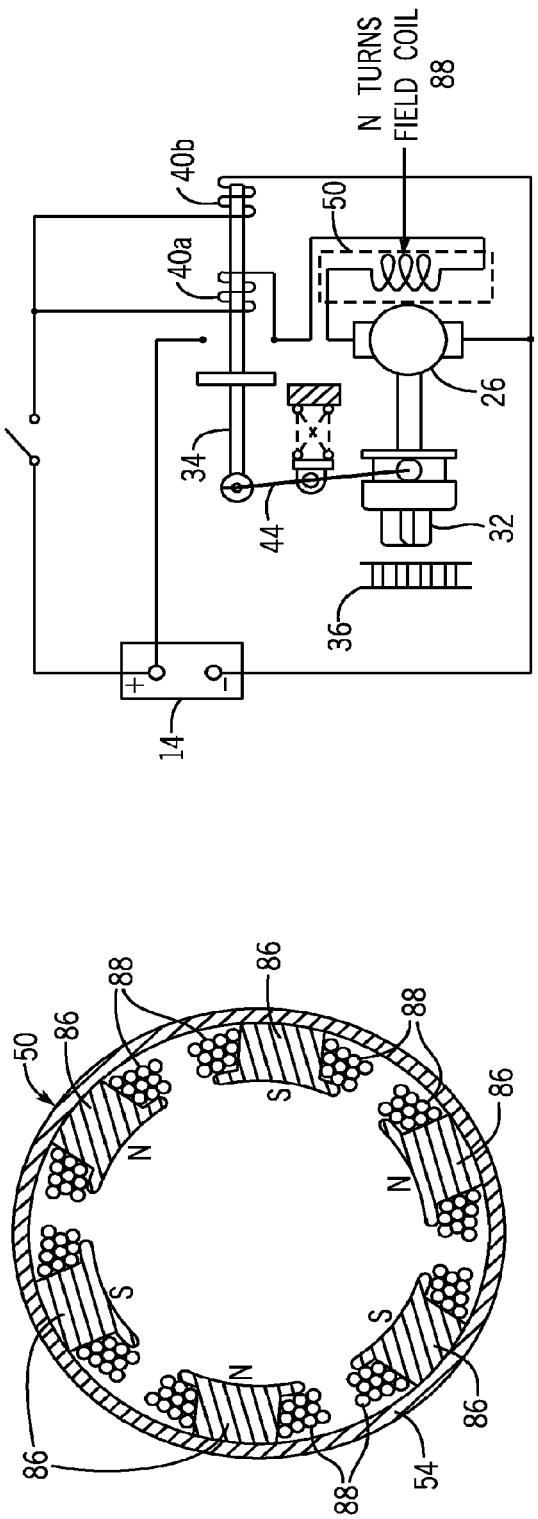
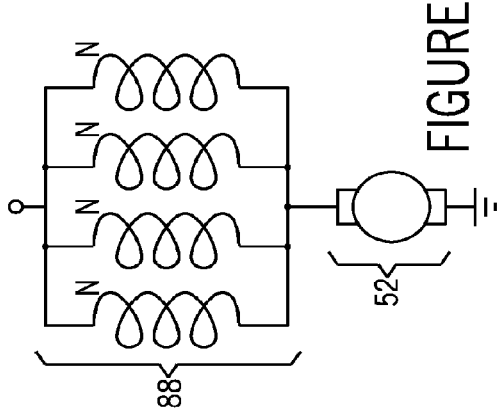
FIGURE 13A
FIGURE 13B
FIGURE 12

STARTER MACHINE SYSTEM AND METHOD

RELATED APPLICATIONS

This application claims priority under 35 U.S.C. §119 to U.S. Provisional Patent Application Nos. 61/473,032, 61/473,042, and 61/473,048, all filed on Apr. 7, 2011, the entire contents of these applications are incorporated herein by reference.

BACKGROUND

Some electric machines can play important roles in vehicle operation. For example, some vehicles can include a starter machine, which can, upon a user closing an ignition switch, lead to cranking of engine components of the vehicle. Some starter machines can include a field assembly that can produce a magnetic field to rotate some starter machine components.

SUMMARY

Some embodiments of the invention provide a starter machine control system including an electronic control unit. In some embodiments, the control system can include a starter machine that can be in communication with the electronic control unit. In some embodiments, the starter machine can comprise a solenoid assembly that can include at least one biasing member and first and second coil windings. In some embodiments, the starter machine can also include a motor that is coupled to a pinion. In some embodiments, the motor can include a field assembly and an armature assembly. In some embodiments, the field assembly can include a support body and permanent magnets that can be supported within the support body. In some embodiments, a plurality of flux members can be disposed between the permanent magnets. In some embodiments, a plurality of windings can be disposed around the flux members and can be coupled to a control circuit.

DESCRIPTION OF THE DRAWINGS

FIG. 12 is a cross-sectional view of a portion of a field assembly according to one embodiment of the invention.

FIGS. 13A and 13B are circuit diagrams of portions of a starter machine according to some embodiments of the invention.

DETAILED DESCRIPTION

Figure 1:
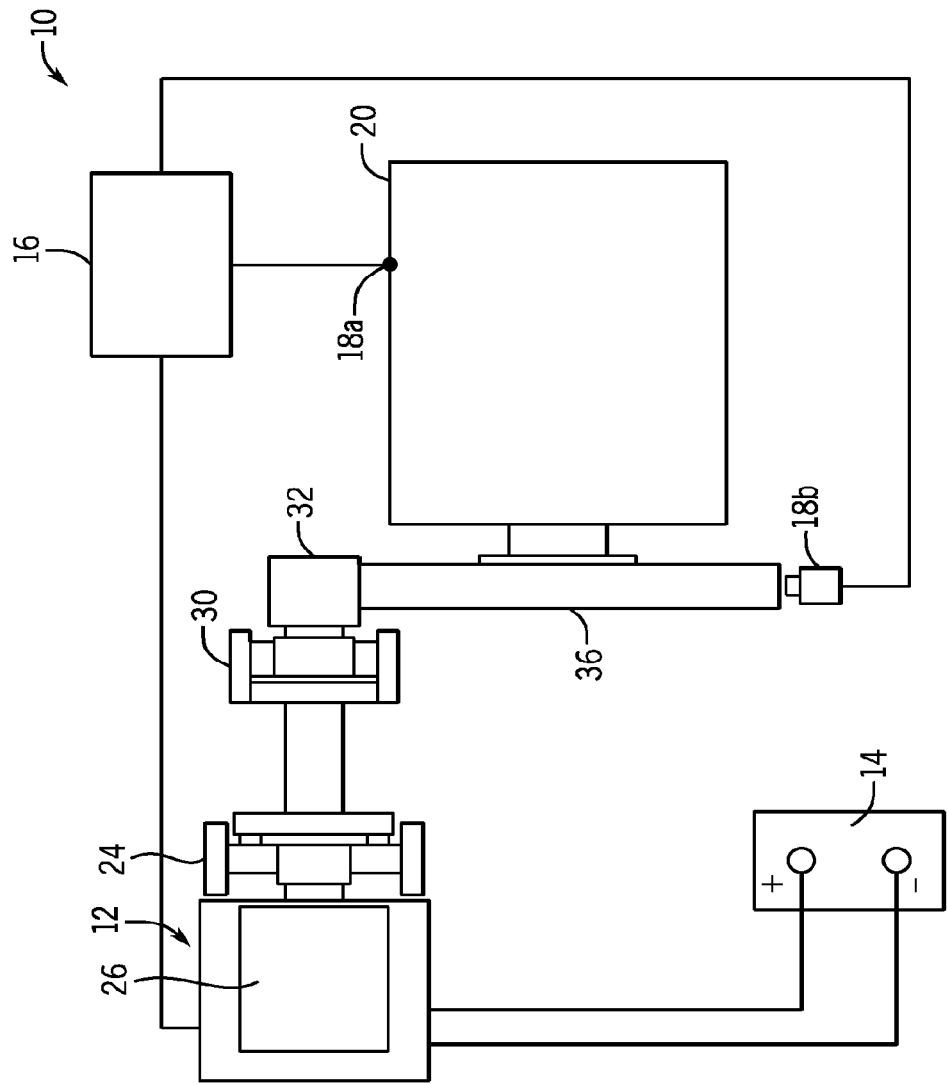
FIG. 1 is a diagram of a machine control system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

FIG. 1 illustrates a starter machine control system 10 according to one embodiment of the invention. The system 10 can include an electric machine 12, a power source 14, such as a battery, an electronic control unit 16, one or more sensors 18, and an engine 20, such as an internal combustion engine. In some embodiments, a vehicle, such as an automobile, can comprise the system 10, although other vehicles can include the system 10. In some embodiments, non-mobile apparatuses, such as stationary engines, can comprise the system 10.

The electric machine 12 can be, without limitation, an electric motor, such as a hybrid electric motor, an electric generator, a starter machine, or a vehicle alternator. In one embodiment, the electric machine can be a High Voltage Hairpin (HVH) electric motor or an interior permanent magnet electric motor for hybrid vehicle applications.

Figure 2:
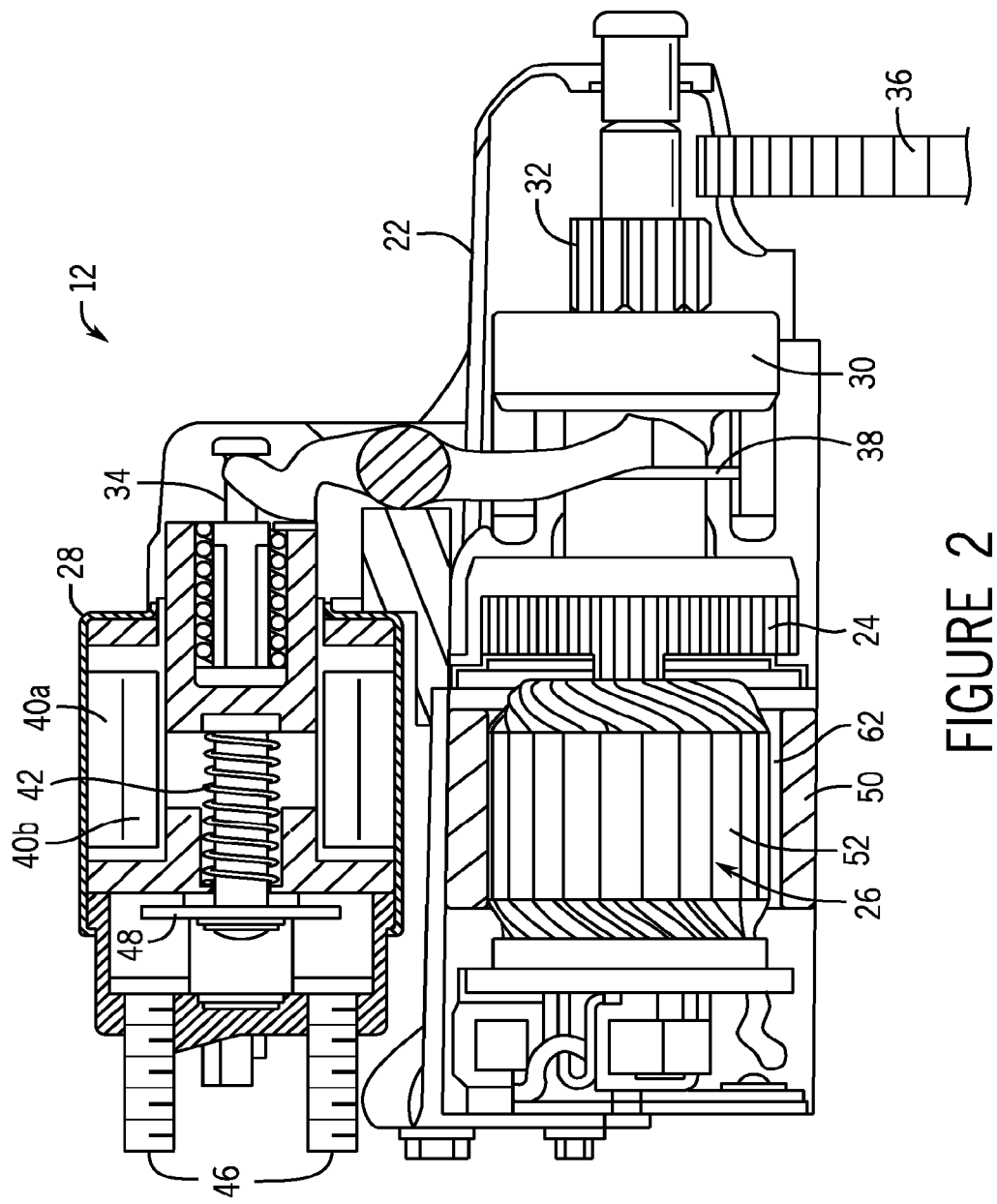
FIG. 2 is a cross-sectional views of a starter machine according to one embodiment of the invention.

As shown in FIG. 2, in some embodiments, the electric machine 12 can comprise a starter machine 12. In some embodiments, the starter machine 12 can comprise a housing 22, a gear train 24, a brushed or brushless motor 26, a solenoid assembly 28, a clutch 30 (e.g., an overrunning clutch), and a pinion 32. In some embodiments, the starter machine 12 can operate in a generally conventional manner. For example, in response to a signal (e.g., a user closing a switch, such as an ignition switch), the solenoid assembly 28 can cause a plunger 34 to move the pinion 32 into an engagement position with a ring gear 36 of a crankshaft of the engine 20. Further, the signal can lead to the motor 26 generating an output (e.g., torque, speed, etc.), which can be translated through the gear train 24 to the pinion 32 engaged with the ring gear 36. As a result, in some embodiments, the pinion 32 can move the ring gear 36, which can crank the engine 20, leading to engine 20 ignition. Further, in some embodiments, the overrunning clutch 30 can aid in reducing a risk of damage to the starter machine 12 and the motor 26 by disengaging the pinion 32 from a shaft 38 connecting the pinion 32 and the motor 26 (e.g., allowing the pinion 32 to free spin if it is still engaged with the ring gear 36).

In some embodiments, the starter machine 12 can comprise multiple configurations. For example, in some embodiments, the solenoid assembly 28 can comprise one or more configurations. In some embodiments, the solenoid assembly 28 can comprise the plunger 34, a coil winding 40, and a plurality of biasing members 42 (e.g., springs or other structures capable of biasing portions of the solenoid assembly 28). In some embodiments, a first end of a shift lever 44 can be coupled to the plunger 34 and a second end of the shift lever 44 can be coupled to the pinion 32 and/or the shaft 38 that can operatively couple together the motor 26 and the pinion 32. As a result, in some embodiments, at least a portion of the movement created by the solenoid assembly 28 can be transferred to the pinion 32 via the shift lever 44 to engage the pinion 32 with the ring gear 36, as previously mentioned.

Moreover, in some embodiments, when the starter machine 12 is activated (e.g., by the user closing the ignition switch), the system 10 can energize the coil winding 40, which can cause movement of the plunger 34 (e.g., in a generally axial direction). For example, current flowing through the coil winding 40 can draw-in or otherwise move the plunger 34, and this movement can be translated to engagement of the pinion 32, via the shift lever 44 (i.e., the magnetic field created by current flowing through coil winding 40 can cause the plunger 34 to move). Moreover, the plunger 34 moving inward as a result of the energized coil winding 40 can at least partially compress one of the biasing members 42.

Additionally, in some embodiments, the plunger 34 can be drawn-in or otherwise moved to a position (e.g., an axially inward position) so that at least a portion of the plunger 34 (e.g., a lateral end of the plunger 34) can at least partially engage or otherwise contact one or more contacts 46 to close a circuit that provides current to the motor 26 from the power source 14. As a result, the motor 26 can be activated by the current flowing through the circuit closed by the plunger 34. For example, in some embodiments, the plunger 34 can comprise a plunger contact 48 that can engage the first contacts 46 to close the circuit to enable current to flow to the motor 26.

In some embodiments, after partial or total completion of the starting event (e.g., the engine has at least partially turned over and combustion has begun), the coil winding 40 can be at least partially de-energized. In some embodiments, the reduction or removal of force retaining the plunger 34 in place (e.g., the magnetic field created by current flowing through the coil winding 40) can enable at least one of the compressed biasing members 42 to expand. As a result, the biasing member 42 can expand and return the plunger 34 to its original position before the initial energization of the coil winding 40 (i.e., a "home" position). Accordingly, the pinion 32 can be withdrawn from the ring gear 36 and return to its original position within the housing 22.

As shown in FIG. 2, in some embodiments, the solenoid assembly 28 can comprise more than one coil winding 40. For example, as shown in FIG. 2, the solenoid assembly 28 can comprise two coil windings 40. In some embodiments, the solenoid assembly 28 can comprise a first coil winding 40a and a second coil winding 40b. For example, in some embodiments, the coil windings 40a, 40b can function as conventional coil windings 40. In some embodiments, the first coil winding 40a can be configured and arranged to function as a "pull-in" coil winding 40 and the second coil winding 40b can be configured and arranged to function as a "hold-in" coil winding 40, or vice versa. For example, the first coil winding 40a can be initially activated by the electronic control unit 16 to move the plunger 34 from the home position until the contacts 46, 48 engage to close the circuit (i.e., the first coil windings 40a can function to initially "pull-in" the plunger 34) and to move the pinion 32 into engagement and/or abutment with the ring gear 36. In some embodiments, the second coil winding 40b can be activated upon the contacts 46, 48 engaging or another signal resulting from the plunger 34 moving. Upon activation, the second coil winding 40b can function to retain or "hold-in" the plunger 34 during a starting episode. Moreover, during activation of the second coil winding 40b, the solenoid assembly 28 can be configured and arranged so that the first coil winding 40a is substantially or completely deactivated by the activation of the second coil winding 40b. For example, the second coil winding 40b can comprise a greater resistance and, as a result, a lesser current relative to the first coil winding 40a. Accordingly, the second coil winding 40b can operate at a lower temperature relative to the first coil windings 40a, and, as a result, can operate for longer periods of time because of the lesser thermal output by the winding 40b. In some embodiments, after the engine 20 has been started, the second coil winding 40b can be substantially or completely deactivated and the biasing members 42 can move the plunger 34 back to the home position.

In some embodiments, the coil windings 40a, 40b can be coupled to and/or in communication with the electronic control unit 16 and the power source 14. For example, as previously mentioned, current can circulate through the coil windings 40a, 40b to move the plunger 34, and, as a result, move the pinion 32 toward the ring gear 36. In some embodiments, the current circulating through the coil windings 40a, 40b can originate from the power source 14 (e.g., the battery). Moreover, in some embodiments, the electronic control unit 16 can control the current flow to one, some, or all of the coil windings 40a, 40b from the power source 14 so that the plunger 34 moves upon the electronic control unit 16 transmitting the necessary signals for current to flow to the coil windings 40a, 40b.

Figure 3:
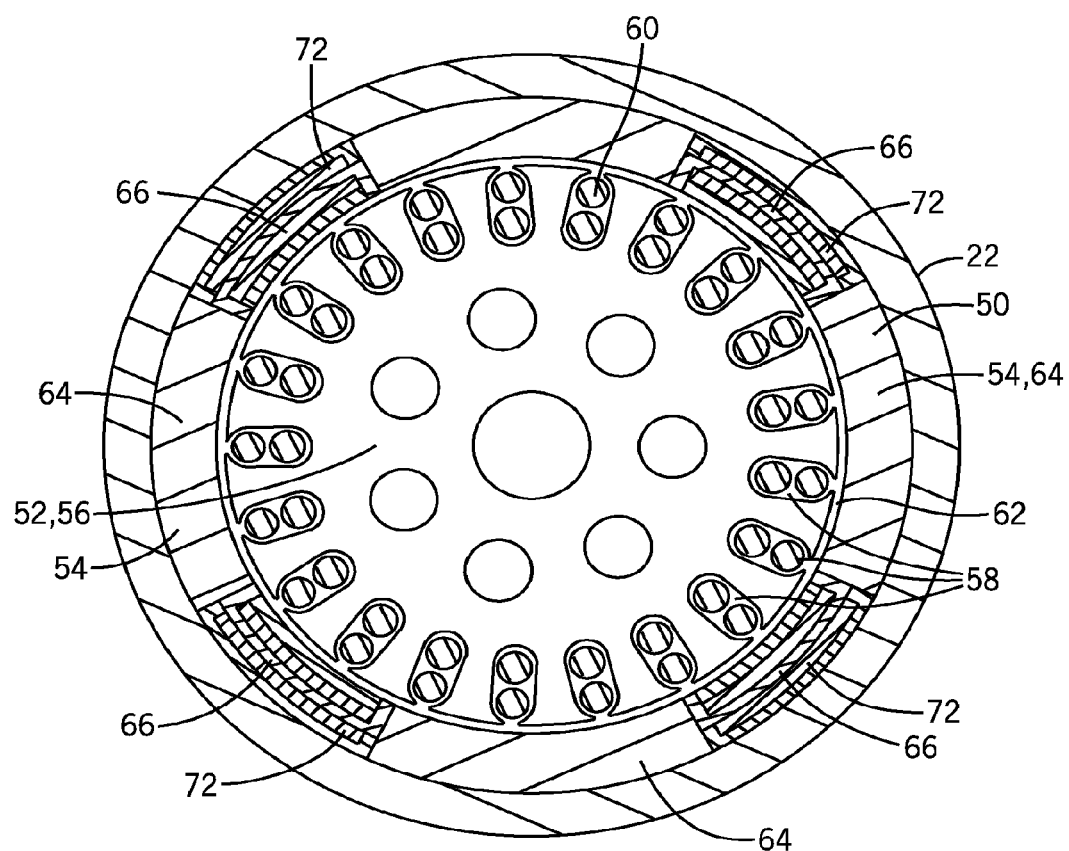
FIG. 3 is a cross-sectional view of a motor of an electric machine according to one embodiment of the invention.
Figure 4:
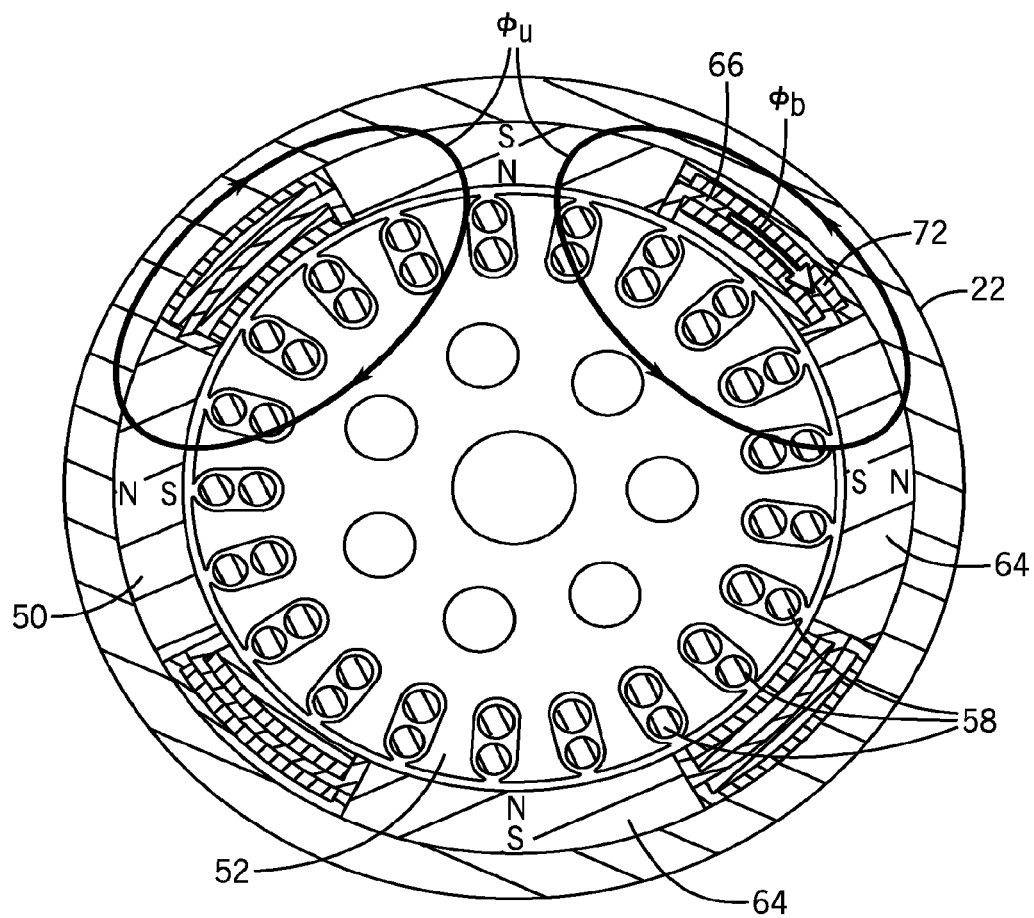
FIG. 4 is a cross-sectional view of a motor of an electric machine according to one embodiment of the invention.

In some embodiments, the motor 26 can comprise a conventional starter machine 12 configuration. For example, in some embodiments, the motor 26 can comprise a field assembly 50 that substantially circumscribes at least a portion of an armature assembly 52, as shown in FIGS. 2-4. Further, in some embodiments, the armature assembly 52 can comprise a brushed configuration (e.g., can include a commutator). In other embodiments, the armature assembly 52 can comprise a brushless configuration (not shown). In some embodiments, the armature assembly 52 can be operatively coupled to the shaft 38. As a result, in some embodiments, the motor 26 output can be translated to the pinion 32 and the ring gear 36 via the shaft 38.

As shown in FIGS. 3 and 4, in some embodiments, the field assembly 50 can comprise a support body 54. In some embodiments, the support body 54 can comprise a generally cylindrical shape, although in other embodiments the support body 54 can include other shapes such as circular, rectangular, hemispherical, or regular or irregular polygonal shapes. Also, in some embodiments, the support body 54 can comprise a tube shape or any other shape desired by the manufacturer or end user. In some embodiments, the support body 54 can be disposed within a portion of the housing 22, as shown in FIGS. 2-4. For example, in some embodiments, the support body 54 can be coupled to an inner surface of the housing 12 (e.g., via interference fitting, press fitting, shrink fitting, adhesives, coupling devices, etc.) to retain the support body 54 in position during operations of the starter machine 12.

As shown in FIGS. 3 and 4, in some embodiment, at least a portion of the armature assembly 52 can be disposed within the support body 54. Moreover, in some embodiments, the armature assembly 52 can comprise an armature core 56 that includes a plurality of slots 58. In some embodiments, one or more conductors 60 can be at least partially positioned within at least a portion of the slots 58. For example, in some embodiments, portions of at least two conductors 60 can be disposed in at least a portion of the slots 58. Moreover, as shown in FIG. 2, in some embodiments, the conductors 60 can be generally axially oriented upon completion of the assembly of the electric machine 12. Additionally, in some embodiments, the armature assembly 52 can be disposed within the field assembly 50 so that a radial air gap 62 can be defined between a portion of the field assembly 50 (e.g., an inner surface of the field assembly 50) and a portion of the armature assembly 52 (e.g., an outer surface of the armature assembly 52). In some embodiments, the plurality of slots 58 and conductors 60 can be positioned within the armature core 56 so that the conductors 60 are immediately adjacent to the radial air gap 62.

As shown in FIGS. 3 and 4, in some embodiments, the field assembly 50 can further include a plurality of magnetic elements 64. In some embodiments, the magnetic elements 64 can comprise one or more conventional permanent magnets. In some embodiments, the magnetic elements 64 can comprise any other permanent or transiently magnetic material. In some embodiments, the magnetic elements 64 can be coupled to the support body 54 via conventional fasteners, an adhesive, such as a glue, a plurality of clips, or other coupling methods. In some embodiments, at least a portion of the magnetic elements 64 can be circumferentially arranged within a portion of the support body 54, as shown in FIGS. 3 and 4.

In some embodiments, the magnetic elements 64 can comprise a conventional permanent magnetic configuration. For example, at least a portion of the magnetic elements 64 can comprise at least two poles (i.e., north and south poles) and can emit a magnetic pole flux. In some embodiments, the magnetic pole flux can flow between opposite poles of one or more magnetic elements 64. In some embodiments, the north and south poles can be positioned on substantially opposite sides of the magnetic elements 64. For example, each of the magnetic elements 64 can comprise a north pole and a south pole and the magnetic flux can flow from the north pole toward the south pole of one or more of the magnetic elements 64. In some embodiments, the north and south poles can be positioned on substantially opposite radial portions of the each of the magnetic elements, as shown in FIG. 4. As a result, in some embodiments, the combination of the armature assembly 52 and the field assembly 50, can lead to the creation of torque, which can be used in vehicle operations (e.g., to start the vehicle).

Figure 5:
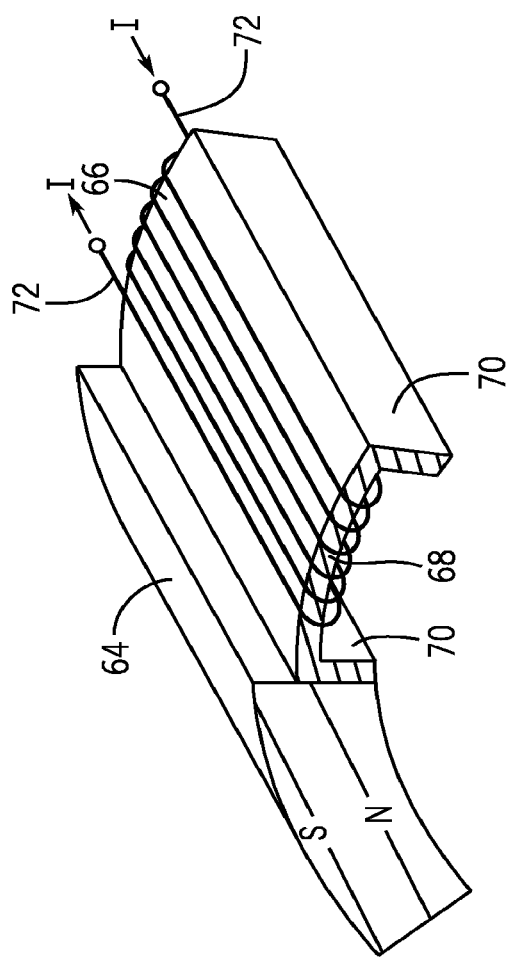
FIG. 5 is a perspective view of a permanent magnet and a bridge according to one embodiment of the invention.

As shown in FIGS. 3-5, in some embodiments, the field assembly 50 can comprise at least one flux member 66 between at least a portion of the circumferentially adjacent magnetic elements 64 positioned in the field assembly 50. For example, in some embodiments, at least a portion of a flux member 66 can be positioned between magnetic poles of adjacent magnetic elements 64. In some embodiments, the flux member 66 can comprise a material such a metal, including steel, iron, or other similar ferromagnetic material. In some embodiments, one or more flux members 66 can be positioned substantially immediately adjacent to at least one of the magnetic elements 64, as shown in FIGS. 3-5.

Referring to FIG. 5, in some embodiments, at least a portion of the flux members 66 can comprise a body 68 and at least two flanges 70. For example, in some embodiments, the flanges 70 can extend a distance so that when positioned adjacent to a magnetic element 64, the body 68 of the flux member 66 can be positioned approximately immediately adjacent to a radially central portion of the magnetic element 64. Moreover, as shown in FIG. 5, in some embodiments comprising radially oriented poles (as shown in FIG. 5), the body 68 can be positioned substantially between the north and south poles.

Referring to FIGS. 3-5, in some embodiments, the body 68 of the flux member 66 can comprise at least one winding 72. The winding 72 can be disposed around a portion of the flux member 66, as shown in FIG. 5. For example, in some embodiments, the winding 72 can be wound around a portion of the body 68 (e.g., wrapped or coiled around a portion of the body 68). In some embodiments, the winding 72 can substantially circumscribe at least a portion the body 68 extending from flange 70 to flange 70, as shown in FIG. 5. In other embodiments, the winding 72 can be disposed around a generally smaller portion of the body 68 (e.g., one half or one third of the body 68). In some embodiments, the winding 72 can be substantially integral with the body 68, and in other embodiments, the winding 72 can be disposed around an outer perimeter of the body 68, as shown in FIG. 5. In some embodiments, the winding 72 can be substantially solenoid-like in structure.

Figure 6:
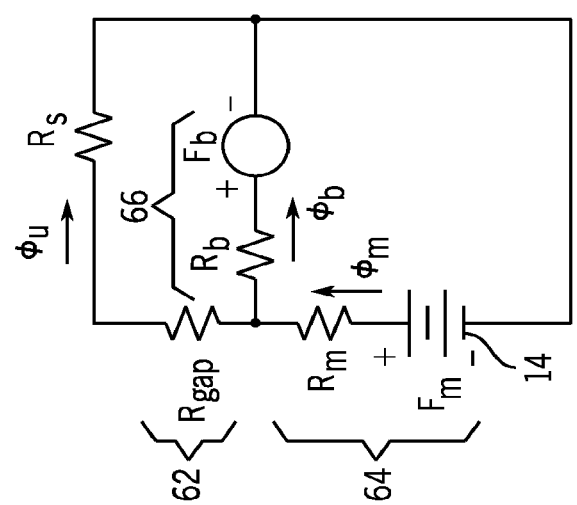
FIG. 6 is a diagram of a magnetic circuit according to one embodiment of the invention.

As shown in FIGS. 4-6, in some embodiments, a current, labeled "I" in FIG. 5, can be passed through the winding 72. For example, in some embodiments, passing current through the winding 72 can create a magnetomotive force in the flux member 66. And, as a result, in some embodiments, the flux member 66 magnetomotive force can be generally positioned between the north and south poles of neighboring magnetic elements 64. Also, in some embodiments, some properties of the magnetomotive force (e.g., direction, magnitude, etc.) can be changed by changing similar properties of the current (e.g., direction, magnitude, etc.). Furthermore, in some embodiments, by passing a current through the winding 72, the flux member 66 also can comprise a member flux, $\Phi_B$ as shown in FIG. 4, which also can be changed by altering some of the properties of the current.

According to some embodiments of the invention, the magnetomotive force of some of the flux members 66 can change a useful flux (i.e., $\Phi_U$ as shown in FIG. 4) originating from at least a portion of the magnetic elements 64. In some embodiments of the invention and conventional electromagnetic motor systems, magnetic flux can include a useful flux $\Phi_U$. By way of example only, useful flux $\Phi_U$ can be magnetic flux emitted by a magnetic element 64 that can be employed in doing work (e.g., operation of the motor 26 to drive the armature assembly 52 to rotate the shaft 38). For example, in some embodiments, a portion of the magnetic flux originating from the magnetic elements 64 that passes through a portion of the conductors 60 of the armature assembly 52 can comprise the useful flux $\Phi_U$ because it can be used in generating torque during operation of the motor 26. Moreover, in some embodiments, the general direction of the magnetomotive force of the flux member 66 (i.e., as created by the direction of the current passing through the winding 72) can at least partially correspond to a general direction of the member flux $\Phi_B$. As a result, in some embodiments, the member flux $\Phi_B$ can at least partially impact the useful flux $\Phi_U$ of some or all of the magnetic elements 64, as discussed below.

In some embodiments, the direction and magnitude of the member flux $\Phi_B$ can impact the useful flux $\Phi_U$ of the magnetic elements 64. Referring to FIGS. 4 and 6, in some embodiments, if the current circulates through the winding 72 of the flux member 66 so that the magnetomotive force of the flux member 66 and the member flux $\Phi_B$ are generally directed toward the north pole of a neighboring magnetic element 64, the member flux $\Phi_B$ can at least partially augment the useful flux $\Phi_U$. For example, in some embodiments, when the useful flux $\Phi_U$ of one or more of the magnetic elements 64 and the member flux $\Phi_B$ are substantially opposing (as shown in FIG. 4), the useful flux $\Phi_U$ can be at least partially increased, which, in some embodiments, can lead to increased torque production by the motor 26. This increase in useful flux $\Phi_U$ can arise at least partially because the member flux $\Phi_B$ can prevent portions of the magnetic elements' 64 magnetic flux from passing through the area immediately adjacent to the flux member 66 or passing through the flux member 66 itself. For example, at least a portion of the magnetic elements' 64 magnetic flux that would pass through portions of the field assembly 50 (i.e., wasted flux) is, in some embodiments, shunted toward the armature assembly 52 to add to the useful flux $\Phi_U$. As a result, a greater proportion of the flux from the magnetic elements 64 can be directed toward the conductors 60 of the armature assembly 52, which increases the useful flux $\Phi_U$ relative to conventional configurations.

Conversely, in some embodiments, the flux member 66 also can decrease useful flux $\Phi_U$. For example, by substantially reducing and/or eliminating current flow through the winding 72, the flux member 66 can decrease useful flux $\Phi_U$. In some embodiments, the flux member 66 can comprise a steel-containing material, which can conduct magnetic flux (e.g., a flux member 66 comprising steel can function as a natural flux leakage path). As a result, relative to embodiments lacking a flux member 66 or a flux member 66 comprising a steel-containing material, more flux from the magnetic elements 64 can flow through the flux member 66, which can result in less flux flowing through the conductors 60 (i.e., less useful flux $\Phi_U$ reaching the conductors 60). Also, in some embodiments, the member flux $\Phi_B$ can at least partially decrease the useful flux $\Phi_U$ by passing current through the winding 72 to create a flux member 66 magnetomotive force and member flux $\Phi_B$ that are generally directed away from the north pole of a neighboring magnetic element 64 (i.e., the two fluxes generally are aligned with each other). As a result, the member flux $\Phi_B$ and the flux of the neighboring magnetic element 64 are no longer in opposition (i.e., the flux from the magnetic element 64 is not longer shunted toward the armature assembly 52) so that flux from some or all of the magnetic elements 64 can freely flow through the flux member 66.

According to some embodiments of the invention, by changing the useful flux $\Phi_U$ of the magnetic elements 64, the operation of the starter machine 12 can also change. Generally, some conventional starter machines 12 can include one peak power point (i.e., based on torque output and speed). For example, elements of some conventional starter machines 12 can comprise a limited ability to change properties (e.g., useful flux $\Phi_U$ from magnetic elements 64 can remain substantially the same throughout the life of the starter machine 12). Moreover, this limited ability to change properties can result in the previously mentioned single peak power point. As a result, for conventional starter machines 12, all other load conditions outside of the peak power point can receive less than peak power, which can result in less than optimal motor 26 performance. For example, some conventional starter machines 12 can be configured so that the single peak power point can occur when the starter machine 12 attempts to start an engine 20 that has not recently been started (i.e., a conventional cold start). Accordingly, any other starting episode (e.g., a start-stop starting episode, as discussed in further detail below) will receive less than peak power and can be difficult to accomplish of a need for increased speed, which can result in greater delays in starting the engine 20. As a result of the increased delays, the engine 20 can output greater amounts of emissions, which is not desirable.

Figure 7:
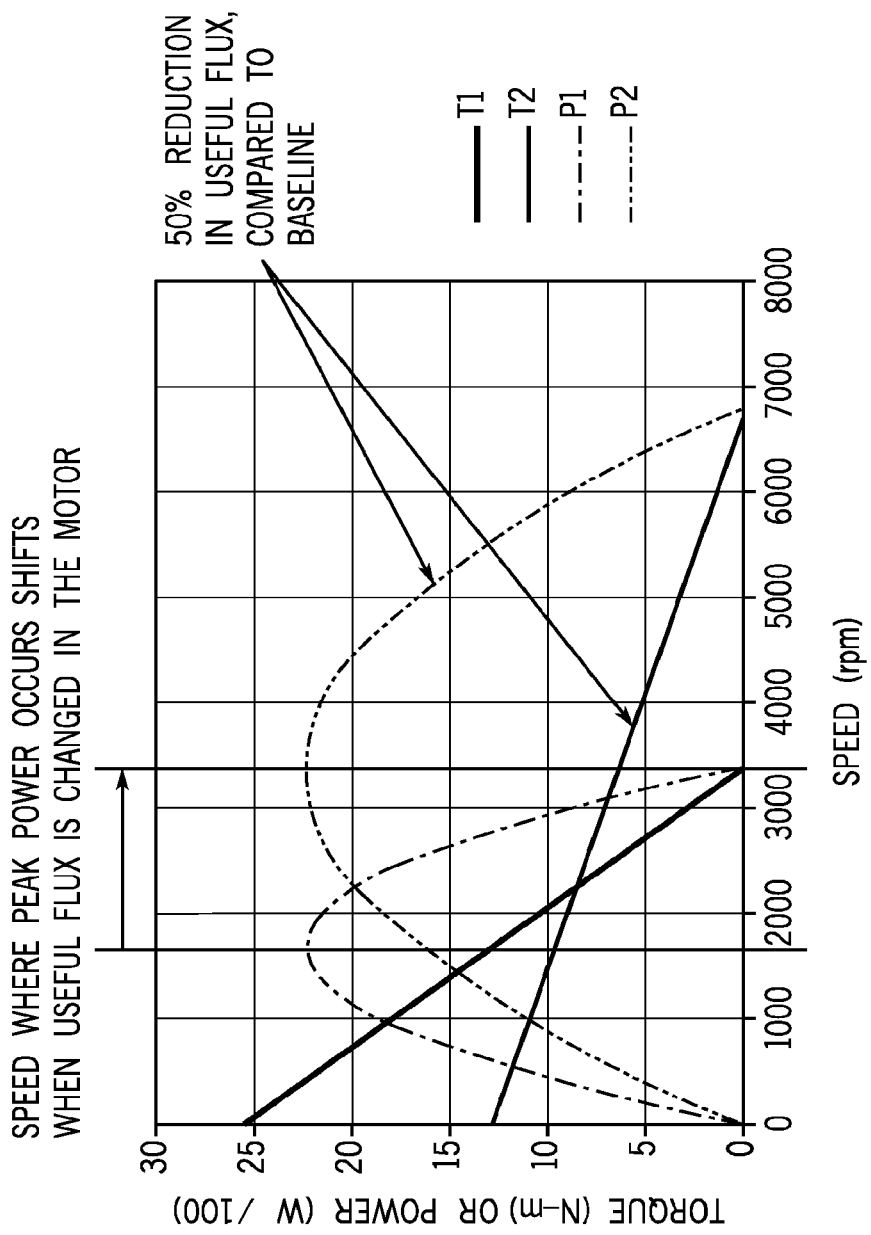
FIG. 7 is a graph representing the impact of useful flux changes on electric machine operation according to one embodiment of the invention.
Figure 8:
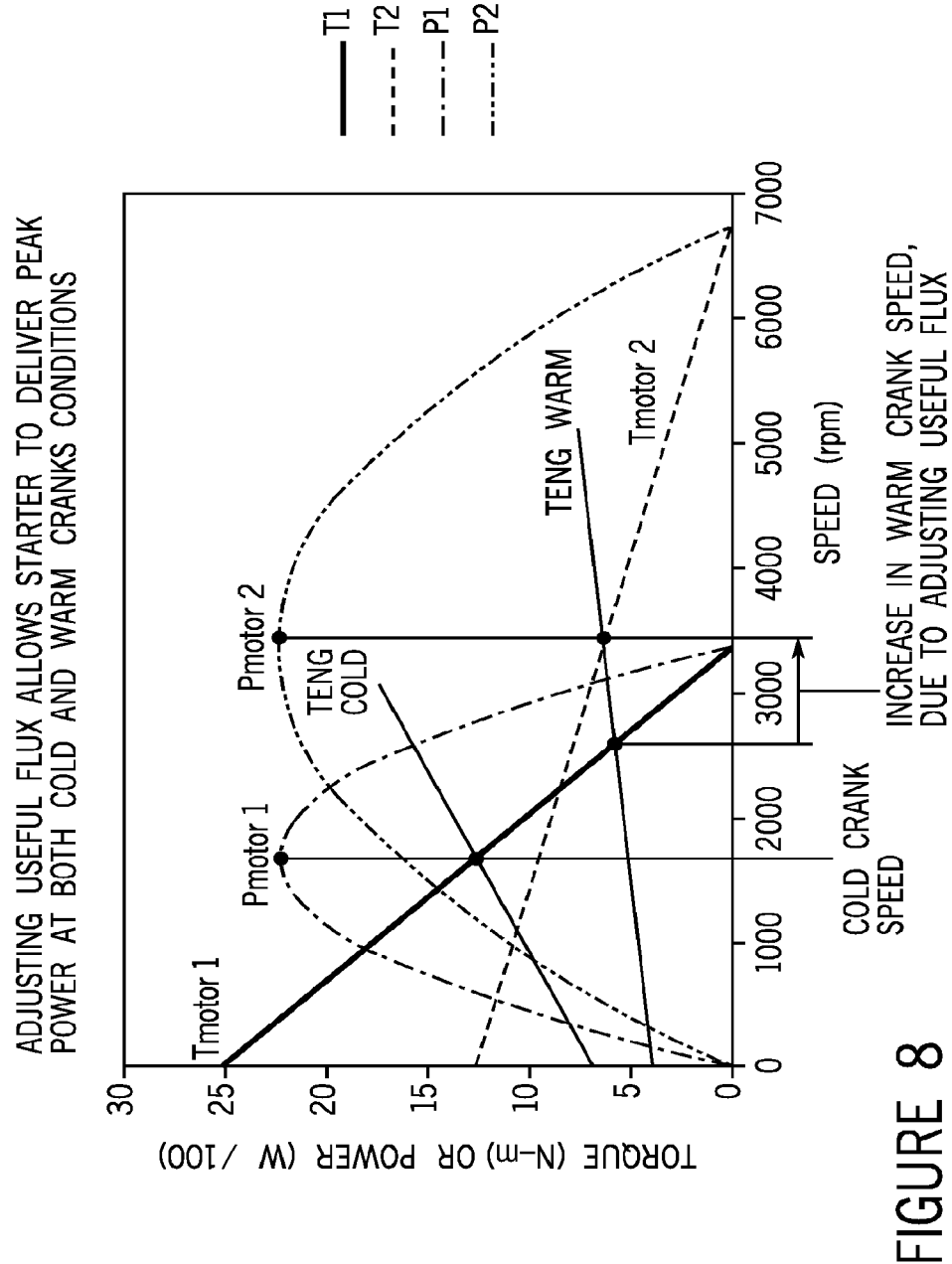
FIG. 8 is a graph representing the impact of useful flux changes on electric machine operation according to one embodiment of the invention.

In some embodiments of the invention, by being able to change the useful flux $\Phi_U$, a single starter machine 12 can comprise more than one peak power point. For example, as shown in FIG. 7, in some embodiments, by reducing useful flux $\Phi_U$, as previously mentioned, a starter machine 12 can operate at a higher free speed (revolutions per minute) and at a lower stall torque (Newton-meters), while still operating at a level at, or substantially close to, peak power. As a result, in some embodiments, a starter machine 12 including a dynamic useful flux $\Phi_U$ property can be more optimally operated relative to some conventional starter machines 12. In some embodiments, as shown in FIG. 8, by adjusting the useful flux $\Phi_U$, a starter machine 12 can deliver peak power under both warm-crank and cold-crank conditions. For example, the motor 26 can operate at a lower speed and produce more torque at lower temperature conditions (i.e., by increasing the useful flux $\Phi_U$) and can operate at a higher speed and produce less torque at higher temperature conditions (i.e., by decreasing the useful flux $\Phi_U$), which can lead to at least partially optimized motor 26 operations.

In some embodiments, at least a portion of the starter machine control system 10 can comprise a control circuit 74. In some embodiments, the starter machine 12 can comprise the control circuit 74, and in other embodiments, the starter machine 12 can be coupled to the control circuit 74 (e.g., electrically coupled), but the control circuit 74 can be positioned at another location. In some embodiments, the control circuit 74 can be configured and arranged to regulate the current flowing through one or more of the windings 72 of one or more of the flux members 66. As a result, the control circuits 74 can at least partially control the useful flux $\Phi_U$ and operations (e.g., output) of the starter machine 12. Moreover, as described in further detail below, in some embodiments, the control circuit 74 can be in communication (e.g., wired or wireless communication) with the electronic control unit 16. As a result, in some embodiments, the electronic control unit 16 can control the control circuit 74. In some embodiments, the control circuit 74 can be configured to regulate current flow in addition to changes in current direction (e.g., positive current and negative current states, such as on positive current, on negative current, and an off current state).

Figure 9:
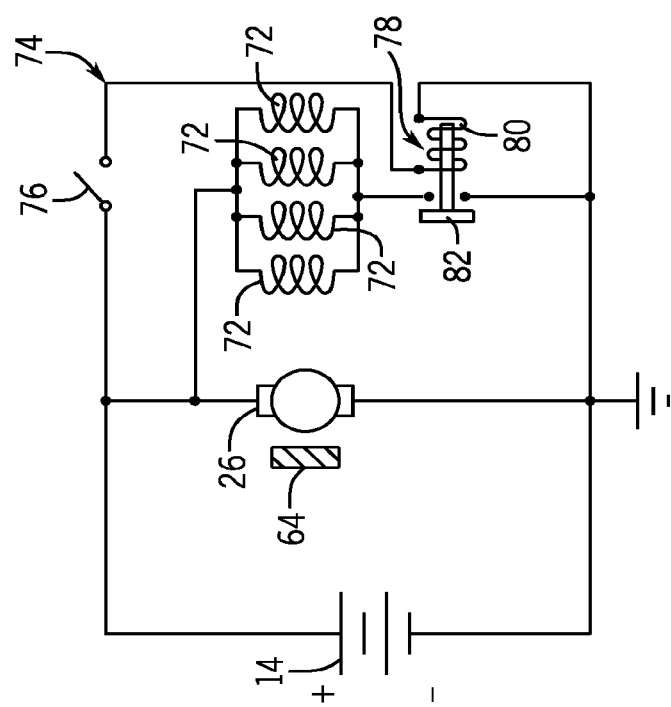
FIG. 9 is a diagram of an electrical control circuit according to one embodiment of the invention.

As shown in FIG. 9, in some embodiments, the control circuit 74 can be configured and arranged to regulate the windings 72 in substantially or completely discrete modes. For example, as illustrated in FIG. 9, the circuit 74 can comprise a switch 76 and a relay 78 so that the control circuit 74 can operate in a substantially "on-off" fashion. As shown in FIG. 9, in some embodiments, the switch 76 can at least partially regulate current flowing to a control winding 80 of the relay 78 and the switch 76 can be in communication with the electronic control unit 16. Accordingly, in some embodiments, upon receiving instructions from the electronic control unit 16, the switch 76 can close to energize the control winding 80, which can move a control plunger 82 to close the relay 80. As a result, current can begin flowing to the some or all of the windings 72 to regulate the useful flux $\Phi_U$. For example, the switch 76 can be closed to circulate current through the windings 72 when greater amounts of useful flux $\Phi_U$ are needed (e.g., the starter machine control system 10 requires greater amounts of torque to start a vehicle). In some embodiments, the control circuit 74 can comprise both a switch 76 and a relay 78 (i.e., in lieu of a single switch 76) because the current necessary to change the useful flux $\Phi_U$ can be of a large enough magnitude that a single conventional switch 76 could become damaged during operations.

In some embodiments, the electronic control unit 16 can at least partially regulate operations of the control circuit 74. For example, in some embodiments, the starter machine control system 10 can comprise at least one temperature sensor 18 in communication with the electronic control unit 16. In some embodiments, the temperature sensor 18 can be in thermal communication with at least a portion of the engine 20. As a result, the thermal sensor 18 can transmit thermal data to the electronic control unit 16 regarding the temperature of the engine 20.

In some embodiments, the electronic control unit 16 can use the data received from the temperature sensor 18 to regulate operations of the control circuit 74. For example, if a user is attempting to start and/or restart a warm engine 20 (i.e., a warm crank condition), less torque output and greater pinion 32 speeds and pinion 32 acceleration can be advantageous to more quickly start the engine 20. Also, if a user is attempting to start a cold engine 20 (i.e., a cold crank condition), more torque output and lesser pinion 32 speeds and pinion 32 acceleration can be advantageous to more quickly start the cold engine 20. Accordingly, by knowing the general temperature of the engine 20, the sensor 18 can provide the electronic control unit 16 with the data necessary to augment the useful flux $\Phi_U$. For example, upon receiving a starting signal (e.g., the user closing the ignition switch by turning a key), the electronic control unit 16 can receive thermal data related to the engine 20 from the temperature sensor 18. The electronic control unit 16 can process the thermal data and assess whether the control circuit 74 should be activated (i.e., closing the switch 76 and the relay 78) or whether the switch 76 should remain open so that no current flows through the windings 72 to increase the useful flux $\Phi_U$. For example, if the temperature of the engine 20 is warm enough so that less torque output and greater pinion 32 speeds would be advantageous in starting the engine 20, the electronic control unit 16 can open the switch 76 (or leave the switch 76 open) to provide less useful flux $\Phi_U$ to the motor 26 to optimize operations (e.g., reduce the useful flux $\Phi_U$ relative to embodiments without a flux member 66). Conversely, if the temperature of the engine 20 is cold enough that more torque output and lesser pinion 32 speeds would be advantageous in starting the engine 20, the electronic control unit 16 can close switch 76 to close the relay 78 and energize the windings 72 to provide more useful flux $\Phi_U$ to the motor 26 to optimize operations. Moreover, in some embodiments, the starter machine control system 10 can change the useful flux $\Phi_U$ at any point before, during, and/or after a starting episode.

Figure 10:
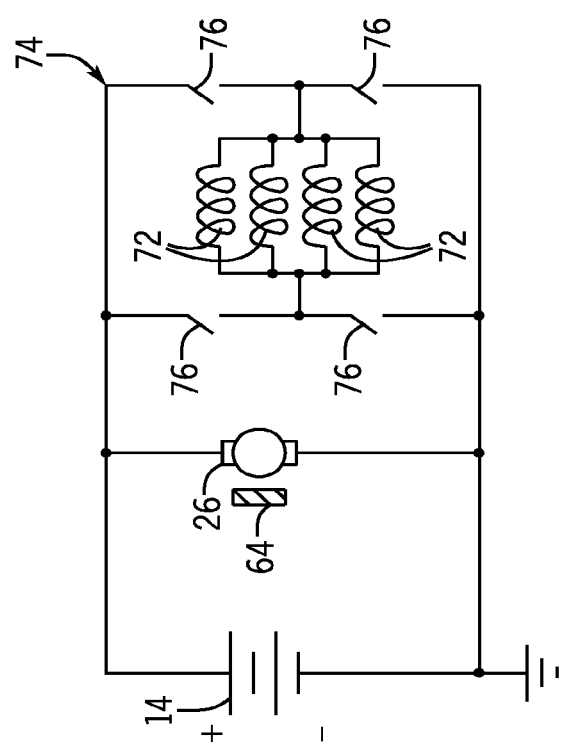
FIG. 10 is a diagram of an electrical control circuit according to one embodiment of the invention.

In some embodiments, the control circuit 74 can comprise alternative configurations. As shown in FIG. 10, the control circuit can comprise a plurality of switches 76 (e.g., four switches 76). In some embodiments, the control circuit 74 can comprise a conventional H-bridge configuration and the control circuit 74 can operate as a conventional H-bridge to regulate current flowing through the windings 72. For example, in some embodiments, the H-bridge configuration can enable the current flow through the windings 72 to comprise a negative or a positive directionality, which can reduce or increase useful flux $\Phi_U$, respectively (e.g., by changing the direction of the member flux $\Phi_B$). Similar to some other embodiments, the control circuit 74 can be in communication with the electronic control unit 16 so that the control unit 16 can control which of the plurality of switches 76 is closed to circulate current (e.g., in a positive or a negative direction) through the windings 72 to change the useful flux $\Phi_U$.

Figure 11:
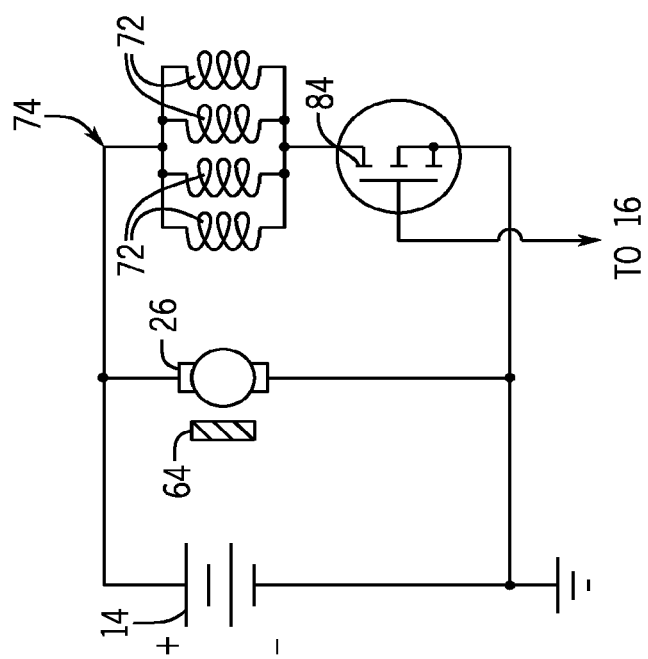
FIG. 11 is a diagram of an electrical control circuit according to one embodiment of the invention.

In some embodiments, the control circuit 74 can be configured and arranged to enable changes in useful flux $\Phi_U$ over a gradient. For example, as shown in FIG. 11, in some embodiments, the control circuit 74 can comprise one or more solid-state switches 84 (e.g., a MOSFET) that are capable of pulse width modulation-based regulation of current passing through the windings 72. The solid-state switch 84 can be in communication with the electronic control unit 16. For example, in some embodiments, in addition to, or in lieu of the one or more temperature sensors 18a, the starter machine control system 10 can comprise one or more speed sensors 18b disposed substantially adjacent to some portions of the engine 20 (e.g., the ring gear 36) and are in communication with the electronic control unit 16. As a result, the electronic control unit 16 can receive at least one of thermal data and engine speed data from sensors 18.

In some embodiments, the electronic control unit 16 can be configured and arranged to process the data received from the temperature and/or engine speed sensors 18 and transmit one or more signals to the solid-state switch 84. For example, as previously mentioned, the electronic control unit 16 can adjust the current passing from the solid-state switch 84 to the windings 72 at least partially based on the engine 20 temperature (e.g., as the temperature increases, the solid-state switch 84 can allow more current to pass through the windings 72 to increase the useful flux $\Phi_U$). Moreover, in some embodiments, because of the capabilities of a solid-state switch 84 to change current magnitude (e.g., via pulse-width modulation), the useful flux $\Phi_U$ can be changed throughout the operation of the starter machine 12 to keep the machine operating at close to peak power levels of speed and torque. For example, during a starting episode, the electronic control unit 16 can receive data from the temperature and engine speed sensors 18 so that the useful flux $\Phi_U$ can be modulated throughout the duration of the starting episode. Furthermore, in some embodiments, the control circuit 74 can comprise a solid-state switch 84 and an H-bridge configuration, which can further increase the range over which the useful flux $\Phi_U$ can vary, which can at least partially increase the flexibility of use of the starter machine 12.

In some embodiments, at least some portions of the starter machine control system 10 can comprise alternative configurations. In some embodiments, the field assembly 50 can comprise an alternative configuration. For example, in some embodiments, the field assembly 50 can comprise a conventional wound field configuration, as shown in FIG. 12. In some embodiments, the conventional wound field configured field assembly 50 can comprise a support body 54 that is differently configured compared to some previously mentioned embodiments. For example, in some embodiments, the support body 54 can comprise a plurality of pole shoes 86 that can be circumferentially arranged around an interior portion of the support body 54, as shown in FIG. 12. In some embodiments, the pole shoes 86 can be substantially integral with the support body 54, and in other embodiments, the pole shoes 86 can be coupled to the support body 54.

In some embodiments, the field assembly 50 can comprise a plurality of field coils 88, as shown in FIGS. 12 and 13A. For example, in some embodiments, the field coils 88 can be at least partially wrapped around the poles shoes 86, as shown in FIG. 12. In some embodiments, each pole shoe 86 can comprise a field coil 88. For example, in some embodiments, the field assembly 50 can comprise four field coils 88, as shown in FIG. 13B, and, in other embodiments, the field assembly 50 can comprise other numbers of field coils 88 (e.g., six field coils 88 and pole shoes 86, as shown in FIG. 12). In some embodiments, the field assembly 50 comprising the pole shoes 86 and the field coils 88 can comprise a conventional wound field configuration and method of operation. For example, in some embodiments, some or all of the field coils 88 can be electrically coupled to a current source (e.g., the power source 14) so that a current can circulate through the field coils 88. As a result of the current moving through the field coils 88, a magnetic field and magnetic flux can be generated by the current and the portions of the support body 54 (i.e., forming an electromagnet). The magnetic flux can be used to drive the armature assembly 52 in a manner substantially similar to some previously mentioned embodiments (e.g., the magnetic flux includes a useful flux $\Phi_U$ that can be used in generating output from the motor 26).

Figure 14A:
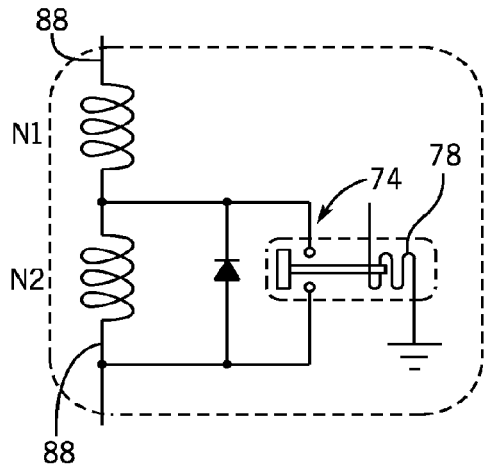
FIGS. 14A-14C are circuit diagrams of portions of a starter machine according to some embodiments of the invention.
Figure 14B:
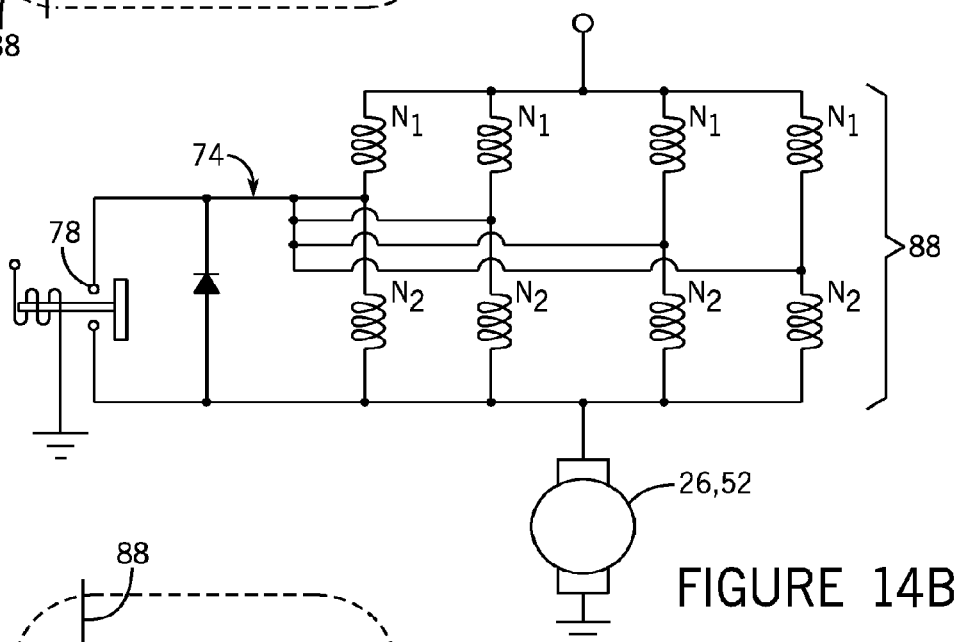
Figure 14C:
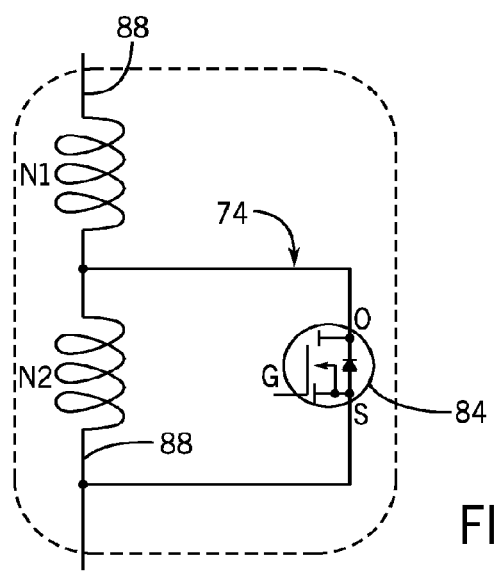

In some embodiments, the field assembly 50 can be configured and arranged to provide variable performance. For example, the field coils 88 can be wrapped around the pole shoes 86 N turns (i.e., N comprises an integer, such as six). In some embodiments, the field coils 88 can be configured to provide variable performance. For example, as shown in FIGS. 14A-14C, at least some of the field coils 88 can be segmented into at least two portions. In some embodiments, a point generally central with respect to a length of the field coils 88 can be accessed to provide control over the useful flux $\Phi_U$. For example, a field coil 88 disposed around at least one of the pole cores 86 can be operatively coupled to a control circuit 74 that is configured to regulate current flowing through a portion of the field coil 88, as shown in FIGS. 14A-14C. As a result, in some embodiments, the control circuit 74 can control current flowing through a second half of at least some of the field coils 88. For example, in some embodiments, the control circuit 74 can be coupled to the field coils 88 at a generally central location to control current flowing through a second half of the field coils 88 (i.e., a half of the field coils 88 that is "down-stream" from the point where the control circuit 74 is coupled to the field coils 88). Moreover, in some embodiments, the total number of turns, N, can be equal to a number of turns, N1, between the current source (e.g., the power source 14) and the point where the control circuit 74 is coupled to the field coil 88 and a number of turns, N2, can be equal to the point where the control circuit 74 is coupled to the field coil 88 and an end of the field coil 88 (i.e., N is equal to N1+N2), as shown in FIGS. 14A-14C.

In some embodiments, the control circuit 74 can at least partially regulate current flowing through the N2 portion of the field coils 88, which can provide a capability to regulate performance. For example, because the control circuit 74 can control current flowing through the N2 portion of the field coils 88, useful flux $\Phi_U$ can be varied by decreasing the amount of current flowing through the N2 field coils 88. Moreover, by introducing a current to the field coils 88, current will flow through the N1 field coils 88, which can lead to magnetic flux production, including useful flux $\Phi_U$. However, by coupling the control circuit 74 to the field coils 88, the magnitude of current circulating through the N2 field coils 88 can be varied, which can result in an augmented magnetic and useful flux $\Phi_U$, relative to embodiments without the control circuit 74. For example, in some embodiments, because current can initially flow through the control circuit 74 prior to entering the N2 field coils 88, the current magnitude can be reduced by the control circuit 74 to reduce the useful flux $\Phi_U$ and vary motor 26 performance.

In some embodiments, the control circuit 74 can comprise at least one of multiple configurations to provide variable performance. For example, as shown in FIGS. 14A and 14B, in some embodiments, the control circuit 74 can comprise one or more relays 78 that can be in communication with the electronic control unit 16 and coupled to ground. Similar to some previously mentioned embodiments, the electronic control unit 16 can be in communication with one or more sensors 18 (e.g., temperature sensors 18 and/or engine speed sensors 18) so that the electronic control unit 16 can regulate operations of the control circuit 74 based on engine 20 operations. In some embodiments, the electronic control unit 16 can be in communication with a temperature sensor 18 so that the electronic control unit 16 can close, open, leave open, and/or leave closed the relay 78 to the N2 field coils 88, depending on the temperature of the engine 20. For example, in some embodiments, upon receiving a signal from the electronic control unit 16 to reduce at least a portion of the useful flux $\Phi_U$, the relay 78 can be closed so that after current passes through the N1 field coils 88, the current can be shunted through the control circuit 74 and grounded (i.e., only N1 field coils 88 produce useful flux $\Phi_U$). As a result, less current can flow through the total field coils 88 and less useful flux $\Phi_U$ can be produced, leading to increased motor 26 speeds and a lessened torque output (e.g., for a warm crank starting episode). Conversely, if more useful flux $\Phi_U$ is needed, the relay 78 can be left open so that current flows through both the N1 and N2 field coils 88, so that full useful flux $\Phi_U$ is produced, leading to a greater torque output (e.g., for a cold crank starting episode). Accordingly, in some embodiments, the control circuit 74 can be configured and arranged to provide discrete regulation of useful flux $\Phi_U$ (i.e., useful flux $\Phi_U$ originating from the N1 field coils 88 or useful flux $\Phi_U$ originating from N1 and N2 field coils 88).

In some embodiments, the control circuit 74 can comprise other configurations. As shown in FIG. 14C, in some embodiments, the control circuit 74 can comprise one or more solid-state switches 84 that are capable of pulse-width modulation-based regulation. Similar to some previously mentioned embodiments, the solid-state switch 84 can be in communication with the electronic control unit 16, which can provide instructions to the solid-state switch 84 to vary the amount of current passing through the N2 field coils 88. For example, in some embodiments, the electronic control unit 16 can be in communication with one or more engine speed sensors 18 and/or temperature sensors 18 that can provide the electronic control unit 16 with data regarding relative speeds of some portions of the engine 20 (e.g., the ring gear 36) and/or the engine temperature. In some embodiments, the electronic control unit 16 can comprise one or more look-up tables (not shown) that can comprise information regarding engine speeds and/or engine temperatures and corresponding peak power output from the motor 26 (i.e., output from the motor 26 that corresponds to the engine 20 data). As a result, in response to changes in engine 20 condition, the electronic control unit 16 can augment operations of the solid-state switch 84 to change the useful flux $\Phi_U$ of the field coils 88. For example, because the solid-state switch 84 is capable of pulse width modulation-based regulation, current flowing through the N2 field coils 88 can be substantially continuously adjusted during operations of the motor 26 to augment the useful flux $\Phi_U$ and to optimize performance of the starter machine 12.

Additionally, in some embodiments, use of the flux member 66 and winding 72 and/or the field coil 88 can also provide a mechanism to at least partially limit engine 20 over-speed-based damage of the motor 26. For example, after engine 20 ignition, if the pinion 32 is still engaged with the ring gear 36, the armature assembly 52 can move at a speed near to its maximum speed (i.e., a "no-load speed"), which can lead to damage of the armature assembly 52. In some embodiments, if the useful flux $\Phi_U$ has been reduced to at least partially increase the speed of the motor 26, the magnitude of the useful flux $\Phi_U$ can be increased to reduce the no-load speed. As a result, the reduced no-load speed can reduce the risk of armature assembly 52 damage due to excessive speed operations.

In some embodiments, portions of the starter machine 12 can comprise alternative configurations. For example, in some embodiments, the starter machine control system 10 can comprise at least two starter machines 12 that can be in communication with the electronic control unit 16. For example, in some embodiments, the two starter machines 12 can be substantially similar except that a first starter machine 12 can comprise a first pinion 32a comprising a lesser number of teeth and a smaller size (e.g., circumference) relative to a second pinion 32b of a second starter machine 12. As a result, the first and second starter machines 12 can comprise different gear ratios because of the differently configured pinions 32a, 32b.

Figure 15:
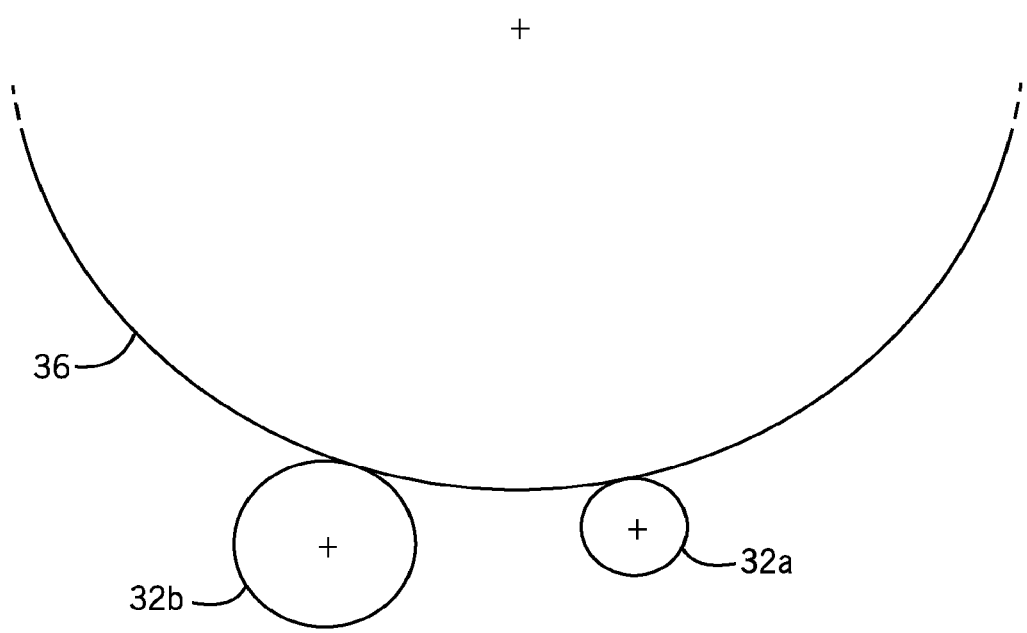
FIG. 15 is a cross-sectional view of portions of the starter machine control system according to some embodiments of the invention.

As shown in FIG. 15, in some embodiments, one or both of the pinions 32a, 32b can engage the ring gear 36 to start the engine 20. For example, in some embodiments, similar to some previously mentioned embodiments, the electronic control unit 16 can sense conditions of the engine 20 via one or more sensors 18 and use that data to assess which pinion 32a, 32b could deliver the greatest peak power to the ring gear 36 to start the engine 20 in the shortest amount of time (e.g., the lower gear ratio of the second pinion 32b or the higher gear ratio of the first pinion 32a).

By way of example only, in some embodiments, if the engine 20 temperature is in a generally colder state, the electronic control unit 16 can instruct the first starter machine 12 to engage the first pinion 32a (i.e., the pinion 32a with a higher gear ratio). As a result, because of the higher gear ratio, the starter machine 12 can transmit more torque, via the pinion 32a, to the ring gear 36, which can lead to more optimal cranking. Conversely, in some embodiments, if the engine 20 temperature is in a generally warmer state, the electronic control unit 16 can instruct the second starter machine 12 to engage the second pinion 32b (i.e., the pinion 32b with a lower gear ratio). As a result, because of the lower gear ratio, the starter machine 12 can transmit less torque, via the pinion 32a, to the ring gear 36 and move at a greater speed, which can lead to more optimal cranking.

Figure 16:
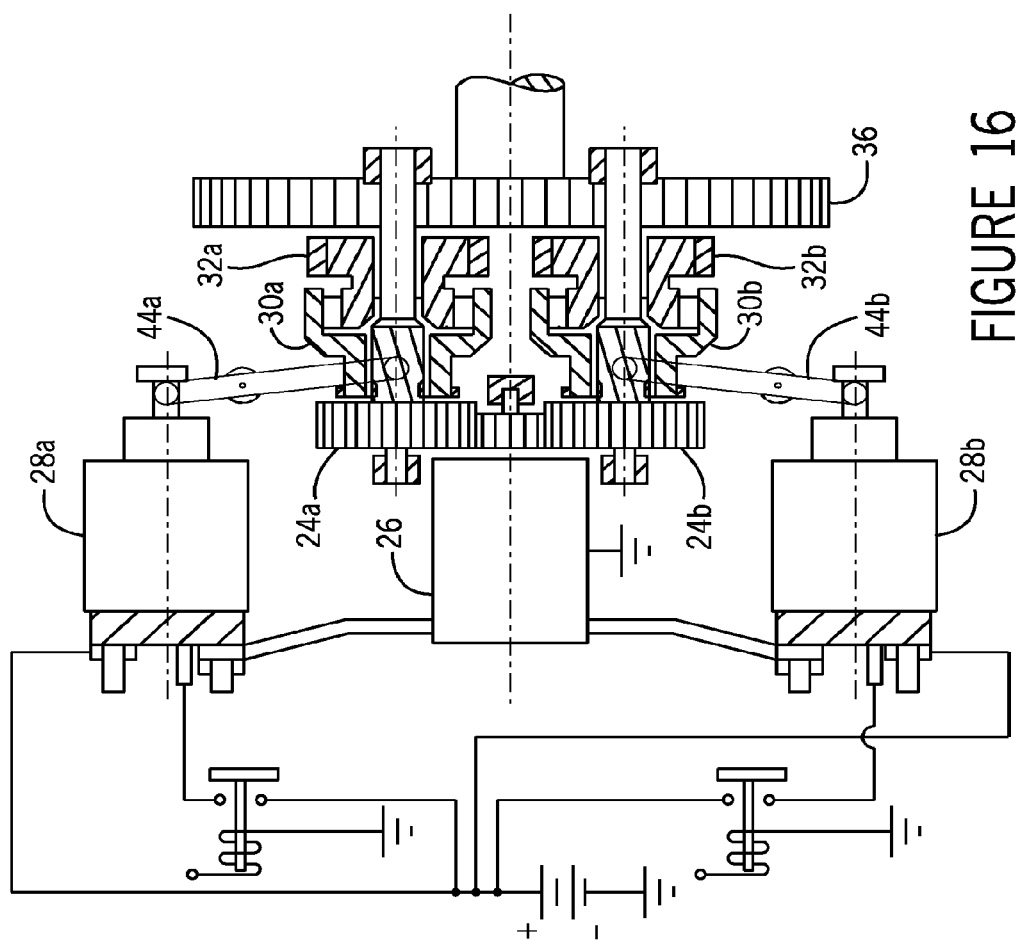
FIG. 16 is a cross-sectional view of a starter machine and a ring gear according to one embodiment of the invention.

In some embodiments, the starter machine 12 can comprise a different configuration. As shown in FIG. 16, in some embodiments, a single starter machine 12 can comprise the first and the second pinions 32a, 32b. Moreover, as shown in FIG. 16, the starter machine 12 can comprise several duplicate elements that can enable different states of operation of the starter machine 12. As shown in FIG. 16, in some embodiments, the starter machine 12 can comprise a first and a second solenoid assembly 28a, 28b, a first and a second shift lever 44a, 44b, the first and the second pinions 32a, 32b, a first and a second gear train 24a, 24b, first and second shafts 38a, 38b, and a first and a second overrunning clutch 30a, 30b. Similar to some previously mentioned embodiments, the motor 26 can be operatively coupled to the gear trains 24a, 24b, which can translate motor 26 output to the first and second pinions 32a, 32b via the shafts 38a, 38b and the clutches 30a, 30b. As shown in FIG. 16, in some embodiments, these two paths can be oriented in a substantially parallel configuration.

In some embodiments, the parallel output paths can be employed to optimize performance of the starter machine 12 using different gear ratios. For example, in some embodiments, the pinions 32a, 32b can comprise substantially similar sizes and numbers of teeth (i.e., substantially similar gear ratios), however, the gear trains 24a, 24b can comprise different configurations. In some embodiments, the first gear train 24a can comprise a greater gear ratio than the second gear train 24b. As a result, in some embodiments, if the electronic control unit 16 determines that more torque and lesser speeds are necessary to provide peak power to the ring gear 36 (e.g., a cold crank starting episode), the electronic control unit 16 can provide a signal to the first solenoid assembly 28 to engage the first pinion 32a (i.e., the pinion 32 that receives output from the first gear train 24a). Conversely, in some embodiments, if the electronic control unit 16 determines that less torque and more speed may be necessary to provide peak power to the ring gear 36 to crank the engine 20 (e.g., a warm crank starting episode), the electronic control unit 16 can provide a signal to the second solenoid assembly 28b to engage the second pinion 32b (i.e., the pinion 32 that receives output from the second gear train 24b).

In some embodiments, the first and second gear trains 24a, 24b can comprise substantially similar gear ratios and the first and second pinions 32a, 32b can comprise different sizes, similar to the pinions 32a, 32b shown in FIG. 15. As a result, in some embodiments, if the electronic control unit 16 determines that more torque and lesser speeds are necessary to provide peak power to the ring gear 36 (e.g., a cold crank starting episode), the electronic control unit 16 can provide a signal to the first solenoid assembly 28 to engage the first pinion 32a with the ring gear 36. Conversely, in some embodiments, if the electronic control unit 16 determines that less torque and more speed may be necessary to provide peak power to the ring gear 36 to crank the engine 20 (e.g., a warm crank starting episode), the electronic control unit 16 can provide a signal to the second solenoid assembly 28b to engage the second pinion 32 with the ring gear 36.

In some embodiments, the starter machine control system 10 can comprise other structures that can enable variable performance of the starter machine 12. For example, in some embodiments, the gear train 24 positioned between the motor 26 and the shaft 38 can comprise a mechanically-variable transmission (not shown). In some embodiments, the mechanically-variable transmission can comprise discrete gear ratios with respect to the motor 26, continuously variable gear ratios with respect to the motor 26, or other configurations. In some embodiments, the starter machine 12 can comprise an actuator (not shown) in communication with the electronic control unit 16 and coupled to the mechanically-variable transmission. For example, in some embodiments, in response to signals from the electronic control unit 16 to optimize the performance of the starter machine 12, the actuator can vary the drive ratio at the mechanically-variable transmission to optimize performance of the starter machine 12 so that its output is at or near to peak power.

In addition to the conventional engine 20 starting episodes (i.e., a "cold start" starting episode and/or a "warm start" starting episode) previously mentioned, the starter machine control system 10 can be used in other starting episodes. In some embodiments, the control system 10 can be configured and arranged to enable a "stop-start" starting episode. For example, the control system 10 can start an engine 20 when the engine 20 has already been started (e.g., during a "cold start" starting episode) and the vehicle continues to be in an active state (e.g., operational), but the engine 20 is temporarily inactivated (e.g., the engine 20 has substantially or completely ceased moving).

Moreover, in some embodiments, in addition to, or in lieu of being configured and arranged to enable a stop-start starting episode, the control system 10 can be configured and arranged to enable a "change of mind stop-start" starting episode. The control system 10 can start an engine 20 when the engine 20 has already been started by a cold start starting episode and the vehicle continues to be in an active state and the engine 20 has been deactivated, but continues to move (i.e., the engine 20 is decelerating). For example, after the engine receives a deactivation signal, but before the engine 20 substantially or completely ceases moving, the user can decide to reactivate the engine 20 so that the pinion 32 engages the ring gear 36 as the ring gear 36 is decelerating, but continues to move (e.g., rotate). After engaging the ring gear 36, the motor 26 can restart the engine 20 via the pinion 32 engaged with the ring gear 36. In some embodiments, the control system 10 can be configured for other starting episodes, such as a conventional "soft start" starting episodes (e.g., the motor 26 is at least partially activated during engagement of the pinion 32 and the ring gear 36).

The following discussion is intended as an illustrative example of some of the previously mentioned embodiments employed in a vehicle, such as an automobile, during a starting episode. However, as previously mentioned, the control system 10 can be employed in other structures for engine 20 starting.

As previously mentioned, in some embodiments, the control system 10 can be configured and arranged to start the engine 20 during a change of mind stop-start staring episode. For example, after a user cold starts the engine 20, the engine 20 can be deactivated upon receipt of a signal from the electronic control unit 16 (e.g., the vehicle is not moving and the engine 20 speed is at or below idle speed, the vehicle user instructs the engine 20 to inactivate by depressing a brake pedal for a certain duration, etc.), the engine 20 can be deactivated, but the vehicle can remain active (e.g., at least a portion of the vehicle systems can be operated by the power source 14 or in other manners). At some point after the engine 20 is deactivated, but before the engine 20 ceases moving, the vehicle user can choose to restart the engine 20 by signaling the electronic control unit 16 (e.g., via releasing the brake pedal, depressing the acceleration pedal, etc.). After receiving the signal, the electronic control unit 16 can use at least some portions of the starter machine control system 10 to restart the engine 20. For example, in order to reduce the potential risk of damage to the pinion 32 and/or the ring gear 36, a speed of the pinion 32 can be substantially synchronized with a speed of the ring gear 36 (i.e., a speed of the engine 20) when the starter machine 12 attempts to restart the engine 20, which can be accomplished using some of the previously mentioned embodiments.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A starter machine control system comprising:
a starter machine configured and arranged to be in communication with an electronic control unit that is in communication with at least one of an engine speed sensor and an engine temperature sensor, the starter machine comprising:
a solenoid assembly comprising at least one coil winding,
a motor being operatively coupled to a pinion, the motor comprising a field assembly and an armature assembly, the field assembly comprising a support body and a plurality of permanent magnets being supported within the support body and circumferentially arranged within the support body,
the permanent magnets each comprising radially oriented north and south poles; and
a plurality of flux members being disposed between the plurality of permanent magnets, and wherein at least a portion of the plurality of flux members comprise a body and at least two flanges,
the body extending circumferentially between two of the plurality of permanent magnets, and each of the at least two flanges adjacent one of the permanent magnets extending radially oriented to the magnets north and south poles; and
a plurality of windings, wherein at least one of the plurality of windings is disposed around each of the plurality of flux members, the plurality of windings being coupled to a control circuit and configured and arranged to change the amount of flux emanating from the magnets; and
where the plurality of windings are configured and arranged to be coupled to a current source.

2. The starter machine control system of claim 1, wherein the plurality of flux members comprise a steel-containing material.

3. The starter machine control system of claim 1, wherein the control circuit comprises at least one switch and at least one relay.

4. The starter machine control module of claim 3, wherein the electronic control unit is configured and arranged to be in communication with the at least one switch.

5. The starter machine control system of claim 1, wherein the control circuit comprises an H-bridge configuration.

6. The starter machine control system of claim 1, wherein the control circuit comprises at least one solid-state switch.

7. The starter machine control system of claim 6, wherein the electronic control unit is configured and arranged to be in communication with the at least one solid-state switch.

8. The starter machine control system of claim 1, wherein the field assembly circumscribes at least a portion of the armature assembly, and wherein the armature assembly comprises an armature core and a plurality of conductors.

9. The starter machine control system of claim 1, wherein the electronic control unit is configured and arranged to regulate current flow through the plurality of windings at least partially based on data received from at least one of the temperature sensor and the engine speed sensor.

10. A starter machine control system comprising:
a starter machine configured and arranged to be in communication with an electronic control unit, the starter machine comprising:
- a solenoid assembly comprising at least one biasing member and at least one coil winding,
- a motor being operatively coupled to a pinion, the motor comprising a field assembly circumscribing an armature assembly, the field assembly comprising a support body including at least one pole shoe and at least one field coil being disposed around the at least one pole shoe, and
- a control circuit electrically coupled to the at least one field coil so that the control circuit is configured and arranged to regulate current flowing through a portion of the at least one field coil, the control circuit configured and arranged to be in communication with the electronic control unit; and
- wherein the control circuit is configured and arranged to control current flowing through the portion of the at least one field coil based on instructions received from the electronic control unit.

11. The starter machine control module of claim 10, wherein the control circuit comprises at least one relay that is configured and arranged to be in communication with the electronic control unit.

12. The starter machine control system of claim 10, wherein the control circuit comprises at least one solid-state switch configured and arranged to be in communication with the electronic control unit.

13. The starter machine control system of claim 10, wherein the field assembly comprises an electromagnetic configuration.

14. A starter machine control system comprising:
a starter machine capable of being in communication with an electronic control unit, the starter machine further comprising
- a solenoid assembly comprising at least one biasing member and at least one coil winding,
- a motor being operatively coupled to a pinion, the motor comprising a field assembly circumscribing an armature assembly, the field assembly further comprising a support body including at least one pole shoe and at least one field coil being disposed around the pole shoe, and
- a control circuit electrically coupled to the at least one field coil so that the control circuit is capable of regulating current flowing through a portion of the at least one field coil, the control circuit capable of being in communication with electronic control unit, wherein the control circuit is configured and arranged to control current flowing through the portion of the at least one field coil based on instructions received from the electronic control unit; and
- wherein the electronic control unit is configured and arranged to change a magnitude of the current passing through the portion of the field coil at least partially based on data received from at least one of the temperature sensor and the engine speed sensor.

* * * * *